(12) United States Patent
DeHart

(10) Patent No.: US 8,971,582 B2
(45) Date of Patent: Mar. 3, 2015

(54) METHOD AND SYSTEM FOR RECORDING AND TRANSFERRING MOTOR VEHICLE INFORMATION

(75) Inventor: Cort DeHart, Fort Worth, TX (US)

(73) Assignee: Digital Recognition Network, Inc., Fort Worth, TX (US)

( * ) Notice: Subject to any disclaimer, the term of this patent is extended or adjusted under 35 U.S.C. 154(b) by 400 days.

(21) Appl. No.: 13/412,373

(22) Filed: Mar. 5, 2012

(65) Prior Publication Data

US 2012/0250938 A1 Oct. 4, 2012

Related U.S. Application Data

(60) Provisional application No. 61/449,477, filed on Mar. 4, 2011.

(51) Int. Cl.
| | |
|---|---|
| G06K 9/00 | (2006.01) |
| G06K 9/03 | (2006.01) |
| G06K 9/62 | (2006.01) |
| H04W 4/00 | (2009.01) |
| H04W 4/04 | (2009.01) |
| G08G 1/127 | (2006.01) |

(52) U.S. Cl.
CPC ........................................ *G08G 1/127* (2013.01)
USPC .............................. 382/105; 382/181; 382/218

(58) Field of Classification Search
CPC ..... G06K 9/00; G06K 9/00664; G06K 9/325; G06K 9/3258; G06K 9/344; G06K 9/62; G06K 9/6201; G06K 2209/15; G08G 1/017; G08G 1/0175; H04W 4/00; H04W 4/046
USPC .......................................... 382/105, 181, 218
See application file for complete search history.

(56) References Cited

U.S. PATENT DOCUMENTS

| | | | | |
|---|---|---|---|---|
| 5,515,042 | A * | 5/1996 | Nelson | 340/937 |
| 6,982,654 | B2 * | 1/2006 | Rau et al. | 340/937 |
| 7,983,835 | B2 * | 7/2011 | Lagassey | 701/117 |
| 8,725,581 | B2 * | 5/2014 | Breed et al. | 382/104 |
| 2004/0218785 | A1 * | 11/2004 | Kim | 382/105 |
| 2005/0084134 | A1 * | 4/2005 | Toda | 382/105 |
| 2007/0139182 | A1 * | 6/2007 | O'Connor et al. | 340/521 |
| 2007/0140595 | A1 * | 6/2007 | Taylor et al. | 382/310 |
| 2010/0157061 | A1 * | 6/2010 | Katsman et al. | 348/149 |

\* cited by examiner

*Primary Examiner* — Michael A Newman
(74) *Attorney, Agent, or Firm* — Paul V. Storm, Esq.; Gardere Wynne Sewell LLP

(57) ABSTRACT

An improved system and method for capturing and uploading pertinent information related to a motor vehicle that is accurate, simple to use, and may be implemented on a wide-array of mobile devices in a cost-effective manner. Methods are also disclosed for users of the mobile devices to send identifying information to a database, where the identifying information is compared to other motor vehicle identifying information located the database.

19 Claims, 5 Drawing Sheets mobile device itself. For example, the mobile device used to capture the photograph of the motor vehicle may be issued to a particular user. The software program on the mobile device may then determine identifying information related to the user of the mobile device by using, for example, a unique identifier for the mobile device such as an electronic serial number ("ESN"). When the mobile device and the database establish a communications link for transfer of information, the user identifying information may be communicated to the database. This communicated user identifying information may be used by the database for purposes such as identifying the person uploading information, and may be later used to allow the database to communicate further instructions to the user based on any hit that may be returned to the mobile device.

METHOD AND SYSTEM FOR RECORDING AND TRANSFERRING MOTOR VEHICLE INFORMATION

TECHNICAL FIELD OF THE INVENTION

The present invention relates generally to a method and system for capturing and uploading identifying information concerning a motor vehicle to a database. The database compares the uploaded information with identifying information in the database to determiner whether there is a correlation between the two sets of information. The invention makes use of a software program running on a mobile device, such as a cellular telephone, operated by a user of the mobile device.

BACKGROUND OF THE INVENTION

Currently, an industry exists that is supported by multiple companies, software, databases, and tools known as the "skip tracing" industry. Skip tracing describes the technique wherein one or more individuals use various resources to locate an individual or property for any number of purposes. Individuals who locate other individuals using such resources are colloquially known as skip tracers; they are quasi-investigators who use communications skills, investigative skills, skip tracing software, public and private databases, and other means to locate an individual.

One particular use of skip tracing is to locate individuals who allegedly owe a debt to a creditor. Often times, a person is being sought because he/she owes money to a creditor and has defaulted on the obligation. These obligations are usually secured by tangible property, assets or collateral which the lender is seeking to recover. For instance, a debtor may purchase a motor vehicle under a loan from a lender, with the lender taking a security interest in the motor vehicle. Should the debtor default by failing to meet the obligations of the loan terms, the lender may seek to recover the motor vehicle to help satisfy the conditions of the loan. Skip tracing may therefore be used to find the person(s), which may or may not be the debtor, who most likely has access to the motor vehicle that secures the loan. Skip tracing may also be used to locate the security interest itself (i.e., the motor vehicle). Upon locating the motor vehicle, the lender may choose to recover the asset to help satisfy the outstanding debt.

A potential problem encountered by skip tracers is that when a subject motor vehicle is located, there is no efficient and cost effective method to verify the description of the motor vehicle in order to determine whether the correct motor vehicle has been located.

SUMMARY OF THE INVENTION

It is therefore a general object of the present invention to provide an improved system and method for capturing and uploading pertinent information related to a motor vehicle that is accurate, simple to use, and may be implemented on a wide-array of mobile devices in a cost-effective manner. It is another object of the present invention to provide methods for users of the mobile devices to send identifying information to a database, where the identifying information is compared to other motor vehicle identifying information located the database.

A method and system for tracking information identifying a vehicle or other asset, which includes capturing and uploading a photograph or date extracted from a photograph and related identifying information of a motor vehicle with a mobile device operated by a user. The mobile device includes certain hardware such as a camera for capturing an image of a motor vehicle, a processor for processing the image of the motor vehicle and for user input of extra identifying information about the mobile vehicle, a global positioning satellite ("GPS") transceiver for determining the present location of the mobile vehicle, an input device configured for user input of further identifying information about the mobile vehicle, storage means for saving the captured photograph and identifying information, and a communication link for establishing communications between the mobile device and a database containing identifying information related to a plurality of motor vehicles.

The user may use a software program on the mobile device, such as a cellular phone, to capture a photograph of a motor vehicle. The photograph may be of the vehicle itself or image data concerning the vehicle, such as the license plate number or vehicle identification number (VIN). The software program concurrently utilizes a GPS transceiver located on the mobile device to determine the present location of the mobile device, and hence the location of the motor vehicle. After the photograph and GPS location have been captured, the software program stores the information onto storage means such as flash memory located on the mobile device. The software may utilize optical character recognition to extract image data from the photograph onboard the mobile device. Alternatively, data can be extracted using OCR or similar algorithms after a photograph is transmitted to a remote database. Using an input interface provided by the mobile device, the user may then input further or additional identifying information related to the motor vehicle. The motor vehicle identifying information may comprise information such as: the motor vehicle license plate number, the state for which the license plate was issued, or the make, model, or year of the motor vehicle. Once the user has finished entering identifying information, the software program stores the identifying information related to the photograph of the motor vehicle in storage means located on the mobile device.

The software program on the mobile device may allow the user to upload the saved photograph and/or extracted image data and input identifying information to a database containing identifying information for a plurality of motor vehicles. The mobile device and database establish a communication link in order to facilitate transfer of the photograph and identifying information. Once the mobile device has finished uploading the photograph and identifying information to the database, the software program may notify the user that the upload was successful. Further, if OCR takes place remotely from the device, the recognized characters may be transmitted back to the mobile device for verification by the user.

After upload to the database, the photograph and/or identifying information is compared to other identifying information already contained in the database to determine whether the user uploaded identifying information matches the description of any motor vehicles in the database. When this validation process is complete, the database sends the results back to the mobile device via the communications link. The results are then processed by the software program on the mobile device, and the user is notified whether there is a "hit." A hit would notify the user that the motor vehicle identifying information submitted by the user matches at least one motor vehicle description in the database. The software program may then provide the user with further instruction related to the motor vehicle, such as instructions on repossessing the motor vehicle.

In one embodiment of the present invention, the software program may determine identifying information related to the motor vehicle by utilizing optical character recognition (OCR) of visual information in the captured photograph.

In another embodiment of the present invention, the OCR software and processing occurs onboard the handheld device and the resulting extracted data is transmitted to the database for comparison and other analysis. as set forth above.

In another embodiment of the present invention, the software program allows the user to submit a number when capturing a photograph is unavailable.

In another embodiment of the present invention, the software program displays error messages to the user in the event of an error and logs the errors.

In yet another embodiment of the present invention, the communication link between the mobile device and the database is a 3G, 4G, Wi-Fi, a WiMAX any other suitable wireless communication link.

In still another embodiment of the present invention, the database gives further instructions to the user on actions to take regarding the motor vehicle.

As referred to hereinabove and throughout, the "present invention" refers to one or more exemplary embodiments of the present invention, which may or may not be claimed, and such references are not intended to limit the language of the claims, or to be used to construe the claims in a limiting manner.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. As used herein, "substantially" is to be construed as a term of approximation.

Figure 1:
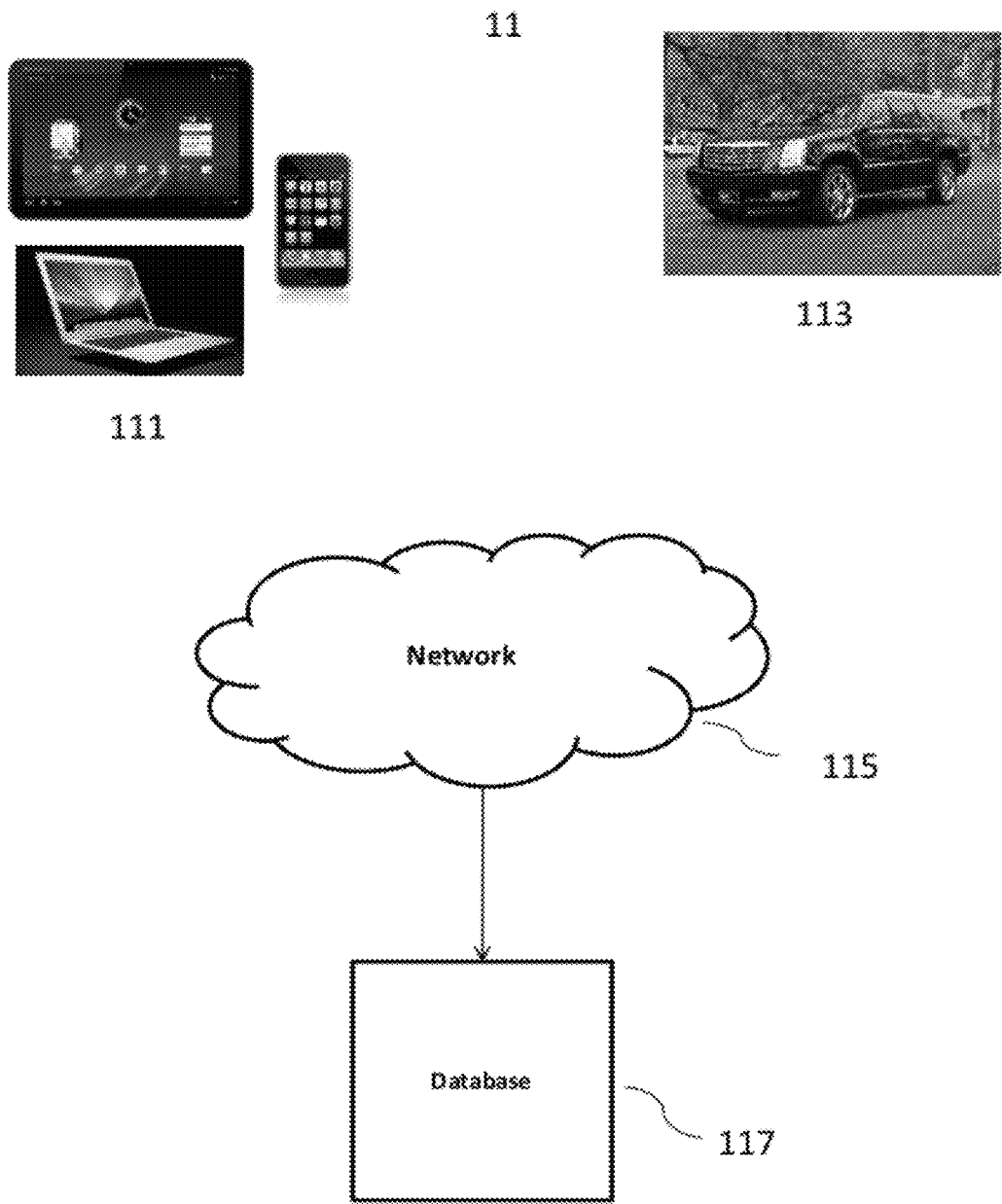
FIG. 1 is a block diagram of a system for utilizing a mobile device to capture a photograph of a motor vehicle and uploading information to a database.

FIG. 1 shows a block diagram of a system 11 for capturing a photograph of a motor vehicle 123. System 11 may comprise a mobile device 111, a motor vehicle 113, a network 115, and a database 117. Mobile device 111 may include a camera for capturing an image of the motor vehicle, a processor for processing the captured photograph of motor vehicle 113 to extract identifying information about motor vehicle 113, an input device configured for user input of further identifying information about the motor vehicle, a GPS transceiver, storage means for storing electronic information on the mobile device, and a communications means for establishing a communications link with database 117 via network 115.

In a preferred embodiment of the present invention, mobile device 111 may be a cellular phone such as an Apple iPhone, an Android powered smartphone, or any number of cellular phones with a processor, a camera means, a GPS means, storage means, and a communications link for data transfer. In another preferred embodiment of the present invention, mobile device 111 may be a notebook computer, a tablet computer, or any other mobile device with a processor, a camera means, a GPS means, storage means, and a communications link for data transfer.

Mobile device 111 may include a software program for capturing a photograph of motor vehicle 113. A user of mobile device 111 may utilize the software program to capture a photograph of motor vehicle 113. After capturing a photograph of motor vehicle 113, the user may input identifying information related to the motor vehicle by way of an input device configured for user input of further identifying information. In a preferred embodiment of the present invention, input device is a physical keyboard attached to mobile device 111. In another preferred embodiment of the present invention, input device is a virtual keyboard displayed on a screen on the mobile device, with the user able to utilize the input device through the use of a physical accessory such as a stylus or by the user's finger.

In one embodiment of the present invention, mobile device 111 includes optical character recognition (OCR) or other pattern recognition software that is capable of extracting data from the photograph, which may be of a license plate, the VIN plate, or another part of the vehicle that offers identifying information. The data can then be extracted by the software and transmitted to the database or remote server along with or in lieu of the photograph and/or user-input identifying information. Whether the data is the photograph itself or data derived from the photograph, such as numbers extracted by OCR or similar processes, the data is referred to herein as "image data" to distinguish it from manually entered or other data or information that is not present in or derived from an image or photograph, referred to herein as "identifying information."

After the user has utilized the software program to capture a photograph of the motor vehicle "image data" and input identifying information related to the motor vehicle into mobile device 111, mobile device 111 may upload the photograph and identifying information to database 117 containing identifying information for a plurality of motor vehicles. The mobile device and database establish a communication link through network 115 in order to facilitate transfer of the photograph and identifying information. Once mobile device 111 has finished uploading the photograph or extracted data (image data) and identifying information to the database, the software program may notify the user that the upload was successful.

If OCR or pattern recognition is performed on the photograph at the remote server or database 117, the extracted data may be returned via data link 117 to mobile device 111 for verification by the user. After upload to database 117, the database compares the image data and identifying information to other motor vehicle identifying information already located in database 117 to determine whether the user uploaded information matches or "hits" the description of any motor vehicles in the database. When this validation process is complete, database 117 sends the results back to the mobile device via the network communications link. The results are then processed by the software program on the mobile device, and the user is notified whether there is a "hit." A hit would notify the user that the motor vehicle identifying information submitted by the user matches at least one motor vehicle description in the database. The software program may then provide the user with further instruction on repossessing the motor vehicle.

Figure 2:
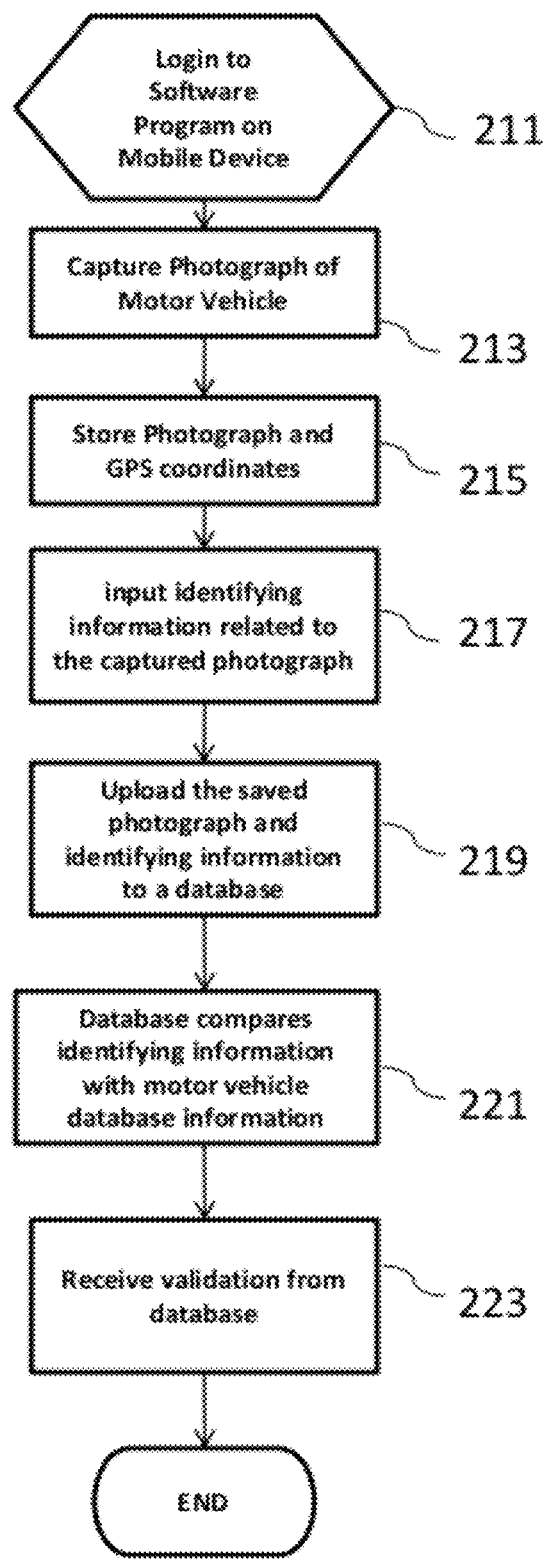
FIG. 2 is a flow chart illustrating a process of utilizing a software program on the mobile device for capturing a photograph of a motor vehicle.
Figure 3A:
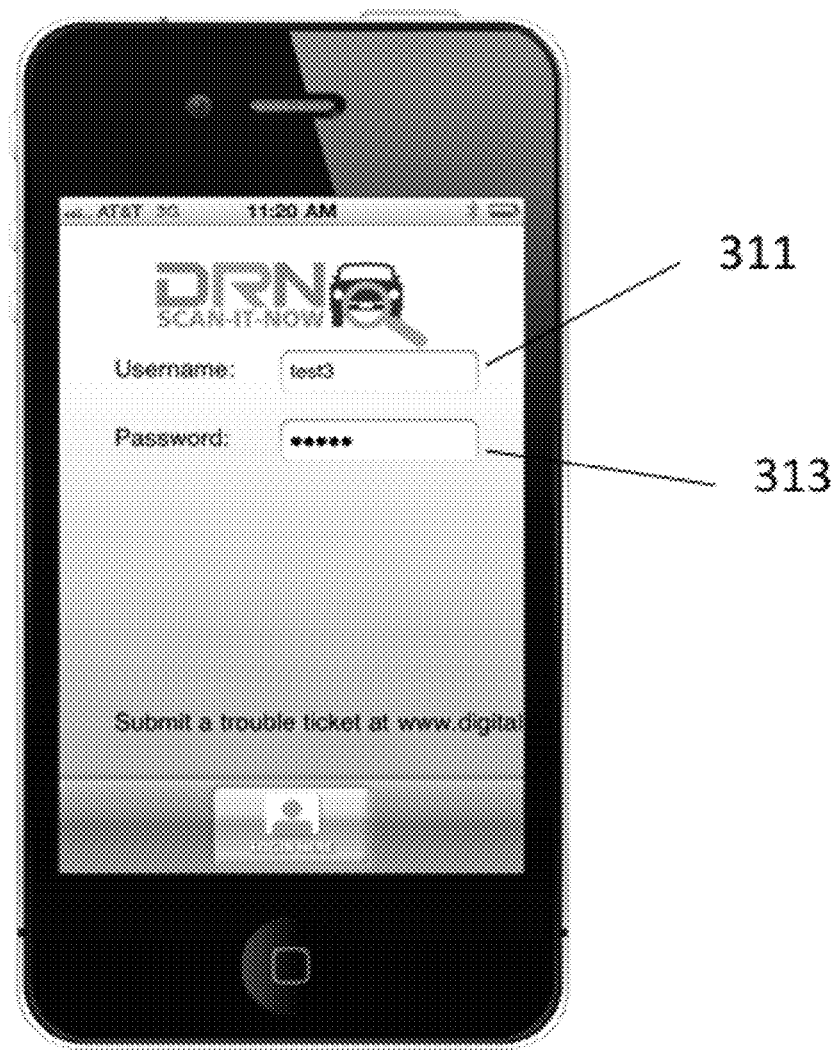
FIG. 3(a) is a picture of an exemplary embodiment of a login screen for a software program on a mobile device.

Turning to FIG. 2, a flow chart of the method steps for a preferred embodiment of the present invention is shown. In step 211, a user opens a software program on mobile device 111. The software program may then request the user login to verify the identity or credentials of the user. A preferred embodiment of the login screen is shown at FIG. 3(a). The user may proceed to login to the software program by entering a user name into a user name field 311, and password into a password field 313 in the software program. The password field 313 may be encrypted to further secure the user's login credentials. The user may input the user name and password information through an input means provided by mobile device 111. Input means may either be a physical keypad or a virtual one displayed on the screen of mobile device 111. In another preferred embodiment of the present invention, the user may input a unique ID as part of the login process. The software may prompt the user to enter a unique ID in lieu of a user name and password combination, or the software may request the user enter a unique ID in addition to the user name and password. In still another embodiment of the present invention, the user may login to the software program through any number of other suitable methods for verifying the user's credentials, including but not limited to, voice recognition, facial feature recognition, and fingerprint verification.

After successfully completing the login process, the user may capture a photograph of a motor vehicle 113 at step 213, by navigating to a selection available in the software program for capturing a photograph. Upon selecting the option to capture a photograph, the user may use mobile device 111 to capture a photograph of the motor vehicle 113. During the capture process, the software program may display a preview of the image to be captured. Once the user determines that the photograph has been suitably framed, the user may capture the photograph through the input interface of mobile device 111.

During the capture of the photograph, mobile device 111 determines the current physical location of the mobile device using a GPS transceiver contained in mobile device 111. In a preferred embodiment of the present invention, the GPS transceiver on mobile device 111 may be assisted or replaced by wireless networks such as 3G or 4G cellular networks, Wi-Fi networks, WiMAX networks, or any other suitable wireless communication link. The mobile device may be able to utilize wireless communications signals to assist in determining the current physical location of the mobile devices, or may use wireless communications signals alone when GPS signals are unavailable, such as when the mobile device is being utilized in a covered garage where GPS signals are weak or unavailable.

In one preferred embodiment of the present invention, the software program may allow the user to review the presently captured photograph. In another preferred embodiment, the software program may provide the user the option of retaking the photograph if the user is unsatisfied with the quality of the currently captured photograph. The captured photograph and the current GPS coordinate information are then stored in mobile device 111 at step 215. In a preferred embodiment of the present invention, storage means may include any number of non-volatile, rewritable memory, such as flash memory or hard disk drives.

Figure 3B:
FIG. 3(b) is a picture of an exemplary embodiment of a camera interface for a software program on a mobile device.

Next, the software program may present the user with a number of identifying information fields to be populated with information related to motor vehicle 113 at step 217. In a preferred embodiment of the present invention, the user may input any number of information into the information fields, such as license plate information for the motor vehicle 113, the state where the motor vehicle is registered under, the make of the motor vehicle, the model of the motor vehicle, and the model year of the motor vehicle. Referring now to FIG. 3(b), an exemplary example of the software program shows the entry of identifying information such as license plate information being input into the software program using a virtual keypad 315.

In another embodiment of the present invention, if no photograph of the motor vehicle was captured, the software program may direct the user to input a specified portion of the motor vehicle's vehicle identification number ("VIN"). The specified portion of the VIN may be stored along with other identifying information in lieu of a photograph of the motor vehicle 113. In yet another preferred embodiment of the present invention, the software program may utilize the mobile device's processor to process the captured photograph of the motor vehicle in order to extract identifying information about the motor vehicle. By way of example, the mobile device's processor may be able to extract the motor vehicle's license plate information from the captured photograph and store it as an identifying information related to motor vehicle 113. Other identifying information that may be extracted from the stored photograph of motor vehicle 113 may include the vehicle's make and model information.

As previously mentioned, if image data, such as license plate number or VIN is extracted from the photograph, it may be presented to the user for verification and confirmation by visual comparison to the actual number.

It is to be understood that other embodiments of the present invention may allow the user to input other types of identifying information into the software, and the currently disclosed embodiments are non-exhaustive. After the user has completed input of identifying information into the information fields provided by the software program, the software programs may save both the captured photograph and related identifying information in storage means located on mobile device 111.

Next, at step 219, the captured photograph along with the user input identifying information may be uploaded to a database by way of a communications link established between mobile device 111 and the database. The photograph may be omitted if data is extracted from it on mobile device 111. In that case, the extracted image data, along with user-input or other identifying information forms the basis for comparison with similar data residing in the database.

The software program may display a selection for uploading the photograph and identifying information. Upon selection by a user, the software program may display the information to be uploaded and may attempt to upload the photograph and identifying information using an established communications link. In a preferred embodiment of the present invention, the communications link may be a wireless networks such as 3G or 4G cellular networks, Wi-Fi networks, WiMAX networks, or any other suitable wireless communication link. In another preferred embodiment of the present invention, the wireless network may transfer information between mobile device 111 and database 117 through the internet. If a communications link has not yet been established, the software program may direct mobile device 111 to attempt to establish a communications link with the database. If mobile device 111 fails to establish a communications link, or the upload fails to completely transfer the captured photograph and identifying information, the software program may display an error message notifying the user of an error, and that the upload was unsuccessful. If the upload completes successfully, the software program may display a message for the user indicating that the upload was successful.

Figure 3C:
FIG. 3(c) is a picture of an exemplary embodiment of a notification from a database.

After database 117 receives the captured photograph and identifying information, database 117 compares the information received from mobile device 111 with information from database 117 to determine whether there is a correlation between the identifying information from the mobile device and the identifying information in the database. If database 117 determines there is a correlation between the identifying information from mobile device 111 and the identifying information in the database, database 117 may send a message to mobile device 111 using network 115, at step 223. Using the received message, mobile device 111 may then display a validation screen for the user. Referring to FIG. 3(c), an exemplary validation screen is shown. The validation screen may display a status message 317 indicating to the user that a "hit" has been determined for the particular motor vehicle 113. The status message 317 may also indicate to the user that the user may be eligible to repossess motor vehicle 113. If, however, database 117 determines that there is not sufficient correlation between the identifying information from mobile device 111 and the identifying information in the database, database 117 may send a message to mobile device 111 over network 115 indicating to the user that the identifying information generated no "hits." In this scenario, status message 317 would display a different message, alerting the user that no hits were detected.

In addition, status message 317 may also be displayed under other circumstances and routine errors, such as if the user input invalid license plate information. In this scenario, status message 317 may alert the user of the error and inform the user to input a valid license plate number.

It will be readily apparent to those skilled in the art that the general principles defined herein may be applied to other embodiments and applications without departing from the spirit and scope of the present invention.

Having thus described the exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is contemplated that the appended claims will cover any such modifications or embodiments that fall within the true scope of the invention.

The invention claimed is:

1. A method of analyzing information related to a motor vehicle, the method comprising the steps of:
   using a handheld mobile device, capturing image data of at least a portion of a motor vehicle and GPS coordinates of the handheld mobile device at the time the image data was captured;
   receiving automobile information at the handheld mobile device, wherein the automobile information relates to attributes of the motor vehicle;
   saving the image data together with the automobile information on the handheld mobile device to form a first set of identifying information;
   establishing a communication between the handheld mobile device and a database, the database containing a second set of identifying information for a plurality of motor vehicles;
   uploading the first set of identifying information from the handheld mobile device to the database;
   receiving at the handheld mobile device a vehicle license plate data that has been extracted from the image data;
   sending confirmation from the handheld mobile device that the vehicle license plate data is accurate;
   after sending confirmation from the handheld mobile device that the vehicle license plate data is accurate, receiving at the handheld mobile device a result of a comparison of the first and second sets of identifying information; and
   displaying on a user interface of the handheld mobile device one or more user instructions relating to the automobile.

2. The method of claim 1 further comprising receiving an indication as to whether there is a correlation between the first and second sets of identifying information.

3. The method of claim 1 wherein the image data of a motor vehicle comprises a photograph of a license plate attached to the motor vehicle.

4. The method of claim 1 wherein the automobile information comprises license plate information input to the handheld mobile device by a user.

5. The method of claim 1 wherein the automobile information comprises motor vehicle make and model information input to the handheld mobile device by a user.

6. The method of claim 2 wherein the handheld mobile device receives the indication over a wireless network.

7. The method of claim 1 wherein the user inputs the automobile information without capturing a photograph of the motor vehicle.

8. The method of claim 1 wherein the automobile information is automatically input to the handheld mobile device from an analysis of the image data.

9. A system for analyzing information related to tracking a motor vehicle, the system comprising:
   a handheld mobile device including:
      a camera for capturing an image data of the motor vehicle;
      a GPS transceiver for determining a location of the handheld mobile device when the camera captures the image data;
      an input device configured for user input of automobile information about the motor vehicle; and
      a display engine to display instructions regarding the automobile;
   a processor for processing the image data of the motor vehicle to extract image information about the motor vehicle;
   the handheld mobile device further comprising a user confirmation engine for receiving user confirmation that the extracted image information is accurate, wherein the extracted image information and the automobile information together comprise a first set of identifying information;

a communication link for establishing communication between the mobile device and a database;

the database comprising a second set of identifying information concerning a plurality of motor vehicles;

a calculation engine for comparing, after the user confirmation engine has received user confirmation that the extracted image information is accurate, the first set of identifying information from the mobile device with the second set of identifying information from the database and indicating correlation between the first set of identifying information and the second set of identifying information; and a notification engine for sending a notification to the handheld mobile device if there is a correlation between the first set of identifying information and the second set of identifying information.

10. The system of claim 9 further comprising a software program on the mobile device for capturing a photograph, receiving automobile information from a user and transferring the first set of information to a database.

11. The system of claim 9 wherein the second set of identifying information comprises license plate information.

12. The system of claim 9 wherein the automobile information from the mobile device comprises motor vehicle make and model information input by the user.

13. The system of claim 9 wherein the automobile information comprises a vehicle identification number that is input by a user without the camera having captured image data of the motor vehicle.

14. The system of claim 9 wherein the automobile information is automatically input from an analysis of the image data.

15. The system of claim 9 wherein the communications link is a wireless communications link.

16. The system of claim 15 wherein the wireless communications link transfers information over the internet.

17. A method of analyzing information related to a motor vehicle, the method comprising the steps of:

establishing a communication between a handheld mobile device and a database, the database containing a second set of identifying information for a plurality of motor vehicles;

receiving image data of at least a portion of a motor vehicle from the handheld mobile device and GPS coordinates of the handheld mobile device at the time the image data was taken;

receiving automobile information from the handheld mobile device, wherein the automobile information relates to attributes of the motor vehicle, wherein the image data together with the automobile information concerning the vehicle form a first set of identifying information;

analyzing the image data to extract vehicle license plate data;

sending the vehicle license plate data to the handheld mobile device;

receiving user confirmation that the vehicle license plate data is accurate;

comparing the first and second sets of identifying information to determine whether there is a correlation between the first and second sets of identifying information;

sending a notification to the handheld mobile device if there is a correlation between the first and second sets of identifying information; and sending user instructions to the handheld mobile device regarding the automobile.

18. The method of claim 17, wherein the handheld mobile device is a mobile phone.

19. The method of claim 17, wherein the user instructions comprise instructions to repossess the motor vehicle.

\* \* \* \* \*

UNITED STATES PATENT AND TRADEMARK OFFICE
CERTIFICATE OF CORRECTION

PATENT NO. : 8,971,582 B2  
APPLICATION NO. : 13/412373  
DATED : March 3, 2015  
INVENTOR(S) : Cort Dehart Page 1 of 1

It is certified that error appears in the above-identified patent and that said Letters Patent is hereby corrected as shown below:

In the Specification:

At column 1, line number 5, replace [determiner] with -- determine --

In the Claims:

At column 8, line number 50, delete "tracking"

Signed and Sealed this
Twenty-second Day of September, 2015

Michelle K. Lee
*Director of the United States Patent and Trademark Office*